(12) United States Patent
DeMoss

(10) Patent No.: US 11,662,913 B2
(45) Date of Patent: May 30, 2023

(54) METHOD FOR MANAGING HARD DISK DRIVE (HDD) PERFORMANCE AT AN INFORMATION HANDLING SYSTEM

(71) Applicant: Dell Products L.P., Round Rock, TX (US)

(72) Inventor: Jeffrey James DeMoss, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 4 days.

(21) Appl. No.: 17/448,235

(22) Filed: Sep. 21, 2021

(65) Prior Publication Data

US 2023/0089174 A1    Mar. 23, 2023

(51) Int. Cl.
*G06F 3/06* (2006.01)
*G06F 11/30* (2006.01)
*G06F 1/20* (2006.01)

(52) U.S. Cl.
CPC ............ *G06F 3/0613* (2013.01); *G06F 1/206* (2013.01); *G06F 3/0604* (2013.01); *G06F 3/0619* (2013.01); *G06F 3/0659* (2013.01); *G06F 3/0674* (2013.01); *G06F 11/3024* (2013.01); *G06F 11/3058* (2013.01)

(58) Field of Classification Search
None
See application file for complete search history.

(56) References Cited

U.S. PATENT DOCUMENTS

| | | | | |
|---|---|---|---|---|
| 6,538,840 B1* | 3/2003 | Seewald | ............... | G11B 5/5556 360/73.02 |
| 6,763,430 B1* | 7/2004 | Camp | ................ | G11B 20/1816 711/170 |
| 7,369,345 B1* | 5/2008 | Li | ........................ | G11B 5/5582 360/73.03 |
| 8,090,902 B1* | 1/2012 | Bennett | ................ | G11B 5/5565 711/170 |
| 8,498,074 B1* | 7/2013 | Mobley | .............. | G11B 5/59655 711/158 |
| 2003/0086200 A1* | 5/2003 | Tokizono | ............. | G11B 5/5521 360/78.08 |

\* cited by examiner

*Primary Examiner* — Stephanie Wu
(74) *Attorney, Agent, or Firm* — McDermott Will & Emery LLP

(57) ABSTRACT

Managing HDD performance at an IHS, including determining, for each write operation, a total number of revolutions of a disk of a HDD to complete the write operation and a number of revolutions of the disk of the HDD during the write operation that a write head of the HDD is off-track; calculating, for each write operation, a performance loss of the HDD; determining an average performance loss (APL) of the HDD over a first time period based on the performance loss of each write operation performed for the first time period; determining that the APL of the HDD over the first time period is greater than the threshold, and in response, performing a mitigation service at the IHS.

17 Claims, 4 Drawing Sheets

— 1 —

METHOD FOR MANAGING HARD DISK DRIVE (HDD) PERFORMANCE AT AN INFORMATION HANDLING SYSTEM

BACKGROUND

Field of the Disclosure

The disclosure relates generally to an information handling system, and in particular, a method for managing hard disk drive (HDD) performance at an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hard disk drives are becoming more sensitive to external vibrations including system fans.

SUMMARY

Innovative aspects of the subject matter described in this specification may be embodied in a method of managing hard disk drive (HDD) performance at an information handling system, the method comprising: determining, for each write operation, a total number of revolutions of a disk of a hard disk drive (HDD) to complete the write operation; determining, for each write operation, a number of revolutions of the disk of the HDD during the write operation that a write head of the HDD is off-track; calculating, for each write operation, a performance loss of the HDD based on a ratio of the number of revolutions of the disk of the HDD during the write operation that the write head of the HDD is off-track to the total number of revolutions of the disk of the HDD to complete the write operation; determining an average performance loss of the HDD over a first time period based on the performance loss of each write operation performed for the first time period; comparing the average performance loss of the HDD over the first time period to a threshold; and determining, based on the comparing, that the average performance loss of the HDD over the first time period is greater than the threshold, and in response, performing a mitigation service at the information handling system.

Other embodiments of these aspects include corresponding systems, apparatus, and computer programs, configured to perform the actions of the methods, encoded on computer storage devices.

These and other embodiments may each optionally include one or more of the following features. For instance, after performing the mitigation service at the information handling system: determining the average performance loss of the HDD over a second time period after the first time period, comparing the average performance loss of the HDD over the second time period to the threshold; and determining, based on the comparing, that the average performance loss of the HDD over the second time period is less than the threshold, and in response, ceasing the mitigation service. After performing the mitigation service at the information handling system: determining the average performance loss of the HDD over a second time period after the first time period, comparing the average performance loss of the HDD over the second time period to the threshold; and determining, based on the comparing, that the average performance loss of the HDD over the second time period is greater than the threshold, and in response, continuing the mitigation service. The mitigation service includes providing a signal to a fan of the information handling system to decrease a speed of the fan. The mitigation service includes providing a signal to a central processing unit (CPU) of the information handling system to throttle a performance of the CPU. Receiving a signal from a central processing unit (CPU) indicating a temperature of the CPU; comparing the temperature of the CPU to a threshold; and determining, based on the comparing, that the temperature of the CPU is above the threshold, and in response, ceasing the mitigation service. Providing a notification to a graphical user interface (GUI) that is displayed by a display device of the information handling system indicting the mitigation service.

Particular implementations of the subject matter described in this specification can be implemented so as to realize one or more of the following advantages. For example, an efficiency of the hard disk drive can be improved by reducing missed revolutions of the hard disk drive.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
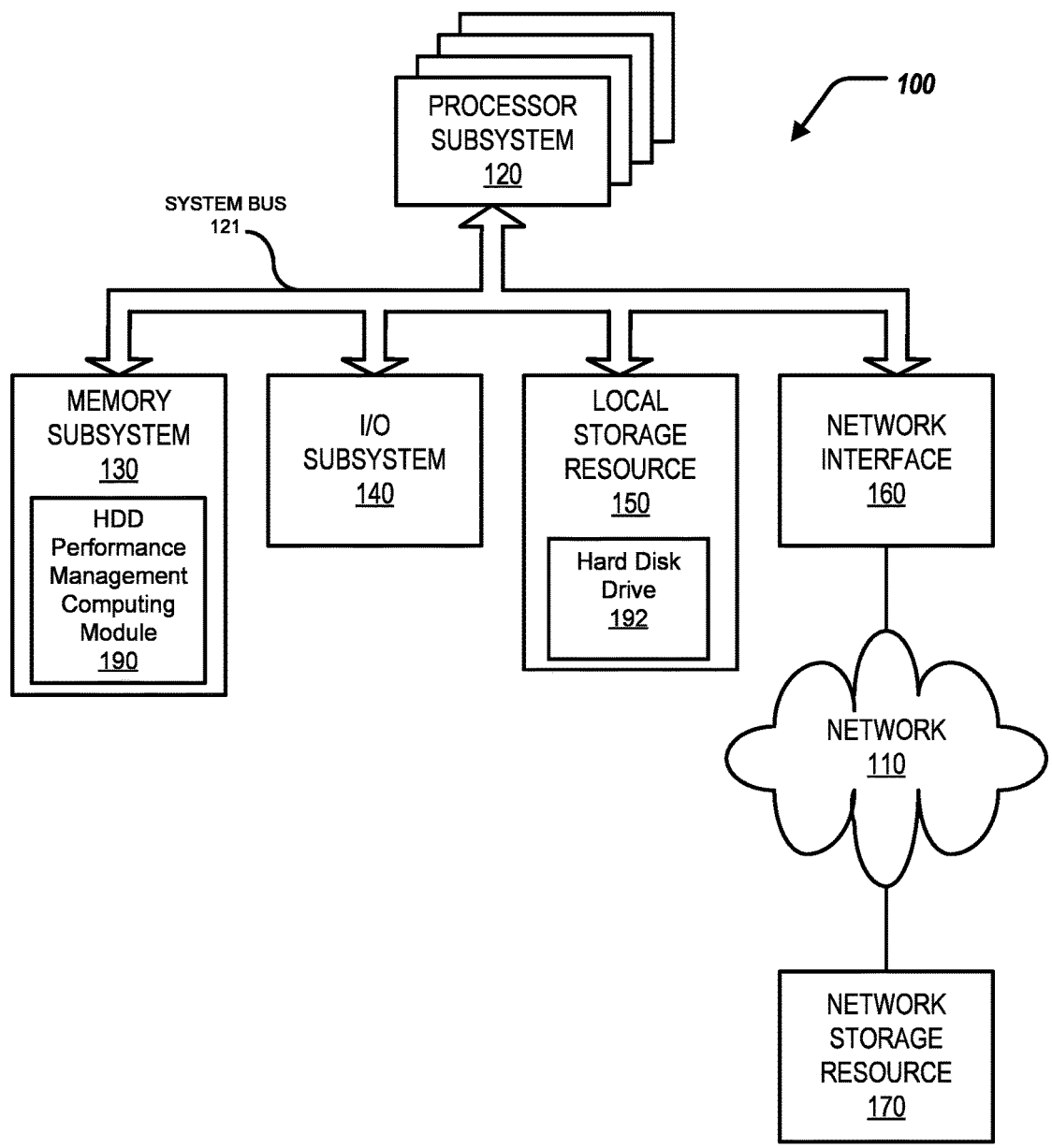
FIG. 1 is a block diagram of selected elements of an embodiment of an information handling system.

This disclosure discusses methods and systems for managing hard disk drive (HDD) performance at an information handling system. In short, the HDD performance management computing module 190 can determine a performance loss of the HDD 192. Specifically, the HDD 192 can experience vibrations, e.g., from a fan of the information handling system 100. The vibration of the HDD 192 can cause revolutions of the HDD 192 where data is not written to the HDD 192, e.g., due to a write head of the HDD 192 being off-track. The HDD performance management computing module 190 can determine such performance loss, and in response, mitigate such performance loss. For example, the HDD performance management computing module 190 can provide a signal to the fan to reduce the fan speed, and/or provide a signal to a CPU to throttle the performance thereof.

Specifically, this disclosure discusses a system and a method for managing hard disk drive (HDD) performance at an information handling system, the method including determining, for each write operation, a total number of revolutions of a disk of a hard disk drive (HDD) to complete the write operation; determining, for each write operation, a number of revolutions of the disk of the HDD during the write operation that a write head of the HDD is off-track; calculating, for each write operation, a performance loss of the HDD based on a ratio of the number of revolutions of the disk of the HDD during the write operation that the write head of the HDD is off-track to the total number of revolutions of the disk of the HDD to complete the write operation; determining an average performance loss of the HDD over a first time period based on the performance loss of each write operation performed for the first time period; comparing the average performance loss of the HDD over the first time period to a threshold; and determining, based on the comparing, that the average performance loss of the HDD over the first time period is greater than the threshold, and in response, performing a mitigation service at the information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, the local storage resource 150 includes a hard disk drive 192. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a hard disk drive (HDD) performance management computing module 190. The HDD performance management computing module 190 can be included by the memory subsystem 130. The HDD performance management computing module 190 can include a computer-executable program (software). The HDD performance management computing module 190 can be executed by the processor subsystem 120.

In short, the HDD performance management computing module 190 can determine a performance loss of the HDD 192. Specifically, the HDD 192 can experience vibrations, e.g., from a fan of the information handling system 100. The vibration of the HDD 192 can cause revolutions of the HDD 192 where data is not written to the HDD 192, e.g., due to a write head of the HDD 192 being off-track. The HDD performance management computing module 190 can determine such performance loss, and in response, mitigate such performance loss. For example, the HDD performance management computing module 190 can provide a signal to the fan to reduce the fan speed, and/or provide a signal to a CPU to throttle the performance thereof.

Figure 2:
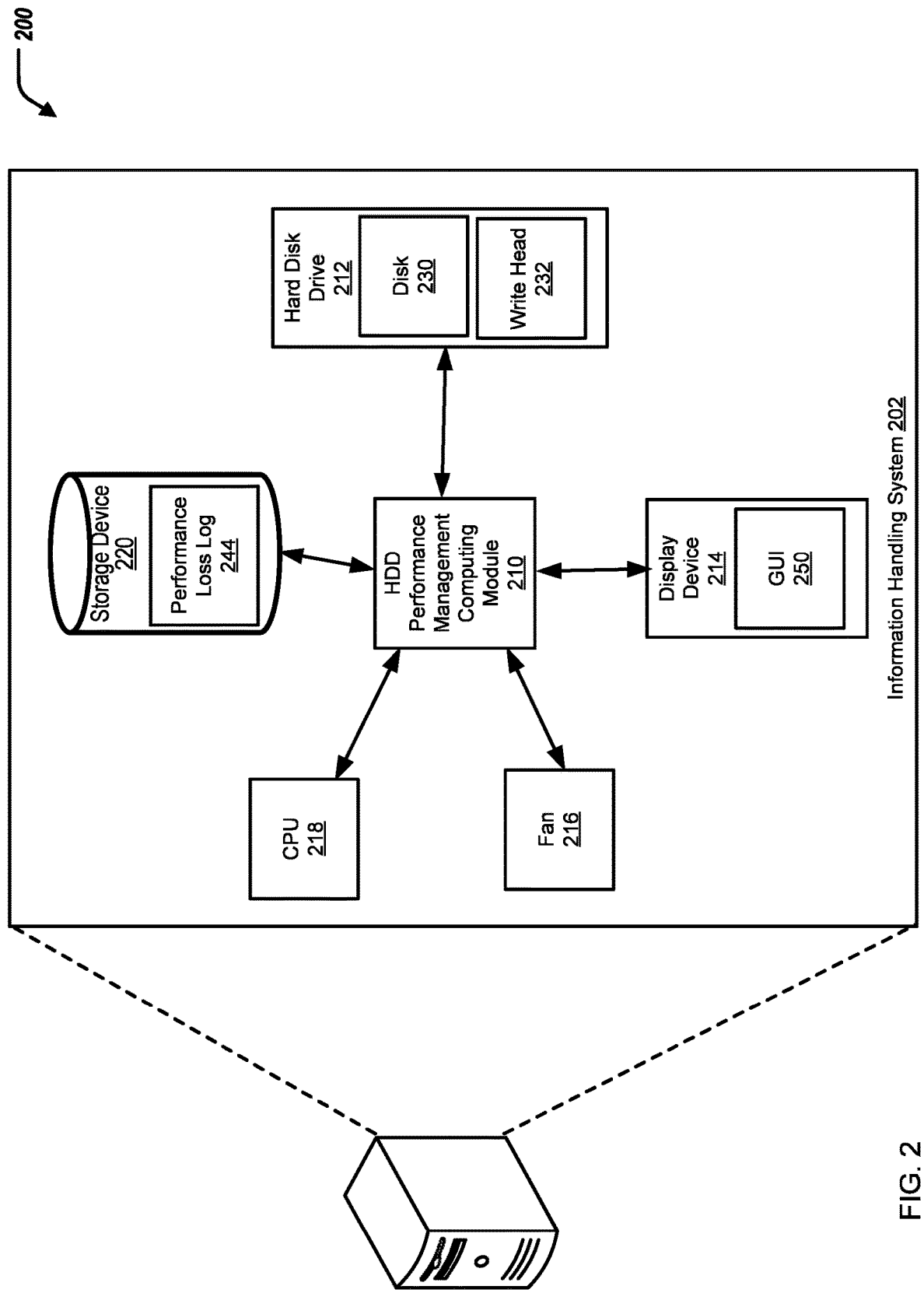
FIG. 2 illustrates a block diagram of an information handling system for managing hard disk drive (HDD) performance.

Turning to FIG. 2, FIG. 2 illustrates an environment 200 including an information handling system 202. The information handling system 202 can include hard disk drive (HDD) performance management computing module 210, a HDD 212, a display device 214, a fan 216, a CPU 218, and a storage device 220. In some examples, the information handling system 202 is similar to, or includes, the information handling system 100 of FIG. 1. In some examples, the HDD performance management computing module 210 is the same, or substantially the same, as the HDD performance management computing module 190 of FIG. 1. In some examples, the HDD 212 is the same, or substantially the same, as the HDD 192 of FIG. 1. In some examples, the CPU 218 is the same, or substantially the same, as the processor subsystem 120 of FIG. 1. In some examples, the storage device 220 is substantially the same as the HDD 212.

The HDD performance management computing module 210 can be in communication with the HDD 212, the display device 214, the fan 216, the CPU 218, and the storage device 220.

Figure 3:
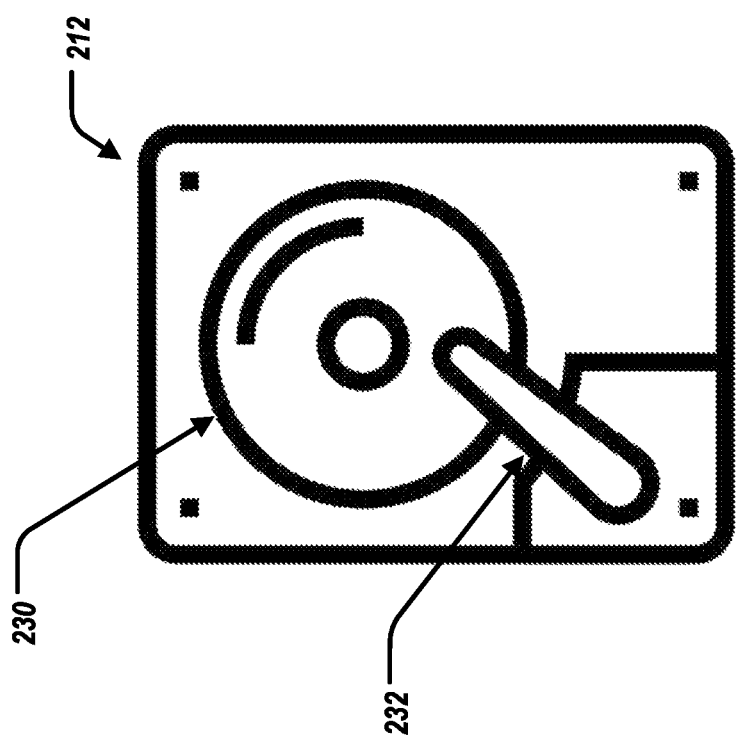
FIG. 3 illustrates a hard disk drive (HDD).

The HDD 212 can include a disk 230 and a write head 232. FIG. 3 illustrates a graphical representation of the HDD 212, including the disk 230 and the write head 232. At a high level, the disk 230 can spin such that the write head 232 can perform write operations on the disk 230.

Figure 4:
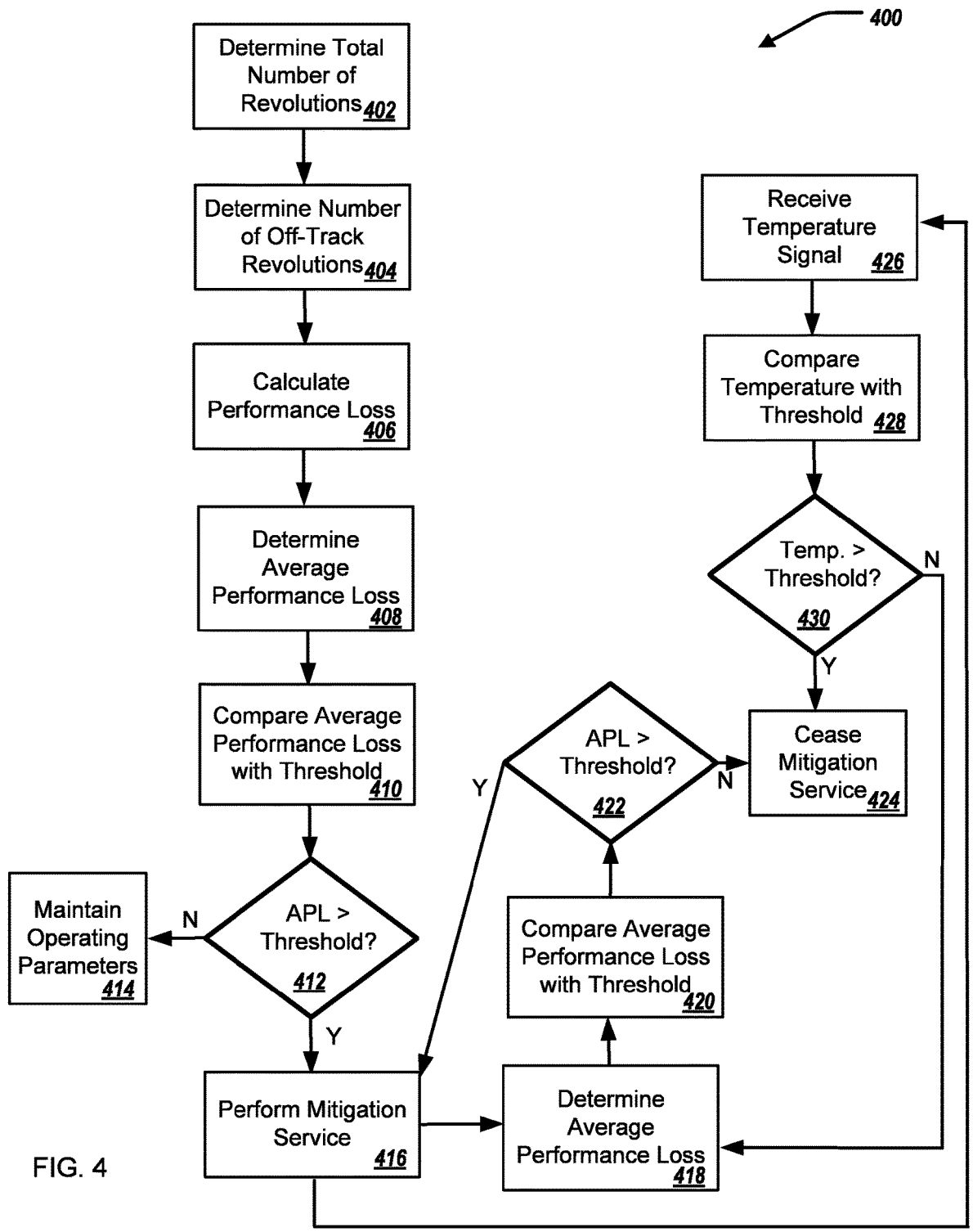
FIG. 4 illustrates a method for managing hard disk drive (HDD) performance.

FIG. 4 illustrates a flowchart depicting selected elements of an embodiment of a method 400 for managing hard disk drive (HDD) performance. The method 400 may be performed by the information handling system 100, the information handling system 202, and/or the HDD performance management computing module 210, and with reference to FIGS. 1-3. It is noted that certain operations described in method 400 may be optional or may be rearranged in different embodiments.

The HDD performance management computing module 210 can determine, for each write operation performed at the HDD 212, a total number of revolutions of the disk 230 to complete the write operation, at 402. The HDD performance management computing module 210 can determine, for each write operation performed at the HDD 212, a number of revolutions of the disk 230 during the write operation that the write head 232 is off-track, at 404. That is, during the write operations on the disk 230, when the write head 232 is off-track for the write operation, the disk 230 performs a revolution with no data being written to the disk 230; and the write head 232 waits for the disk 230 to complete one or more revolutions for the write head 232 to get back "on-track" for the write operation. The revolutions of the disk 230 when the write head 232 is off-track for the write operation can be considered missed revolutions or skipped revolutions. For example, when the HDD 212 experiences vibration above a threshold, the write head 232 may not be able to stay on-track for the write operation. For example, such vibrations can be caused by the fan 216 when the fan 216 is operating (e.g., spinning).

The HDD performance management computing module 210 can calculate, for each write operation performed at the HDD 212, a performance loss (PL) of the HDD 212, at 406. Specifically, the HDD performance management computing module 210 can calculate the performance loss of the HDD 212 based on a ratio of i) the number of revolutions of the disk 230 of the HDD 212 during the write operation that write head 232 of the HDD 212 is off-track (as determined at 404) to ii) the total number of revolutions of the disk 230 of the HDD 212 to the complete the write operation (as determined at 402). For example, the number of revolutions of the disk 230 of the HDD 212 during the write operation that the write head 232 of the HDD 212 is off-track can be 46 and the total number of revolutions of the disk 230 of the HDD 212 to the complete the write operation is 123. Thus, the performance loss of the HDD 212 can be a ratio of 46 to 123, or a performance loss of approximately 37.4%. In other words, the HDD performance management computing module 210 can determine the performance loss of the HDD 212 based on a percentage of time the write head 232 is unable to perform the write operation on the disk 230 of the HDD 212.

The HDD performance management computing module 210 can determine an average performance loss (APL) of the HDD 212 over a first time period based on the performance loss (PL) of each write operation performed at the first time period, at 408. Specifically, the HDD performance management computing module 210 can store data indicating the average performance loss of the HDD 212 over the first time in a performance loss log 244 at the storage device 220. The performance loss log 244 can store the average performance loss of the HDD 212 over multiple time periods.

The HDD performance management computing module 210 can compare the average performance loss of the HDD 212 over the first time period to a threshold, at 410. The HDD performance management computing module 210 can determine whether the average performance loss of the HDD 212 over the first time period is greater than the threshold, at 412.

In some examples, the HDD performance management computing module 210 can determine that the average performance loss of the HDD 212 over the first time period is less than the threshold, and in response, the HDD performance management computing module 210 can maintain operating parameters of the information handling system, at 414. For example, the speed of the fan 216 and/or the performance of the CPU 218 can be maintained.

In some examples, the HDD performance management computing module 210 can determine that the average performance loss of the HDD 212 over the first time period is greater than the threshold, and in response, the HDD performance management computing module 210 can perform a mitigation service at the information handling system, at 416. Specifically, the HDD performance management computing module 210 can perform the mitigation service at the information handling system 202 to decrease (reduce) the average performance loss of the HDD 212. That is, the HDD performance management computing module 210 can perform the mitigation service at the information handling system 202 to decrease (reduce) the average performance loss of the HDD 212 such that the average performance loss of the HDD 212 is below the threshold.

In some examples, the HDD performance management computing module 210 can perform the mitigation service at the information handling system 202 including providing a signal to the fan 216 to decrease a speed of the fan 216. For example, decreasing the speed of the fan 216 can include turning the fan 216 to an off state, or reducing the speed of the fan 216. For example, when the speed of the fan 216 is reduced, the information handling system 202, and in particular the HDD 212, can experience a decreased amount of vibration (shaking) due to rotation of the fan 216 (fan blades of the fan 216). As a result, vibration of the HDD 212 can decrease, resulting in the write head 232 staying on-track for a longer period of time for write operations. As such, by the write head 232 staying on-track for a longer period of time for write operations, the amount of revolutions of the disk 230 during the write operation that the write head 232 is off-track can decrease, resulting in a decrease in performance loss of the HDD 212. Furthermore, the decrease in the performance loss of the HDD 212 can decrease to be below the threshold.

In some examples, the HDD performance management computing module 210 can perform the mitigation service at the information handling system 202 including providing a signal to the CPU 218 to throttle a performance of the CPU 216. Specifically, when the speed of the fan 216 is decreased for the mitigation service, as described herein, the temperature of the CPU 218 may increase (inverse relationship). Thus, the performance of the CPU 216 may be throttled in coordination with reducing the speed of the fan 216 when the mitigation service is implemented.

In some examples, the HDD performance management computing module 210 can perform the mitigation service at the information handling system 202 including providing a notification to a graphical user interface (GUI) 250 of the display device 214 indicating implementation of the mitigation service. For example, the notification can indicate the speed of the fan 216 is being reduced to, that the CPU 218 is being throttled, or both. For example, the notification can indicate that the HDD 212 may be suffering from performance issues (e.g., the performance loss). The notification can further indicate that further action can be taken in response to user input, such as the mitigation services, to mitigate the performance issues of the HDD 212.

The HDD performance management computing module 210, after performing the mitigation service at the information handling system (at 416), can determine the average performance loss of the HDD 212 over a second time period after the first time period, at 418. Specifically, determining the average performance loss of the HDD 212 over the second time period can include determining, for each write operation performed at the HDD 212 during the second time period, a total number of revolutions of the disk 230 to complete the write operation; determining, for each write operation performed at the HDD 212 during the second time period, a number of revolutions of the disk 230 during the write operation that the write head 232 is off-track; calculating, for each write operation performed at the HDD 212 during the second time period, a performance loss (PL) of the HDD 212; and determining an average performance loss (APL) of the HDD 212 over the second time period based on the performance loss (PL) of each write operation performed for the second time period. The HDD performance management computing module 210 can store data indicating the average performance loss of the HDD 212 over the second time period in the performance loss log 244 at the storage device 220.

The HDD performance management computing module 210 can compare the average performance loss of the HDD 212 over the second time period to the threshold, at 420. The HDD performance management computing module 210 can determine whether the average performance loss of the HDD 212 over the second time period is greater than the threshold, at 422.

In some examples, the HDD performance management computing module 210 can determine that the average performance loss of the HDD 212 over the second time period is less than the threshold, and in response, the HDD performance management computing module 210 can cease the mitigation service, at 424. For example, the speed of the fan 216 and/or the performance of the CPU 218 can be adjusted back to nominal operating parameters (the speed of the fan 216 and/or the performance of the CPU 218 is not mitigated).

In some examples, the HDD performance management computing module 210 can determine that the average performance loss of the HDD 212 over the second time period is greater than the threshold, and in response, the HDD performance management computing module 210 can continue the mitigation service, at 416. For example, the HDD performance management computing module 210 can provide the signal to the fan 216 to maintain the decrease in speed of the fan 216, or decrease the speed of the fan 216 further. For example, when the speed of the fan 216 is further reduced, the information handling system 202, and in particular the HDD 212, can experience a further decreased amount of vibration (shaking) due to rotation of the fan 216 (fan blades of the fan 216). As a result, vibration of the HDD 212 can further decrease, resulting in the write head 232 staying on-track for a longer period of time for write operations. As such, by the write head 232 staying on-track for a longer period of time for write operations, the amount of revolutions of the disk 230 during the write operation that the write head 232 is off-track can further decrease, resulting in a further decrease in performance loss of the HDD 212. Furthermore, the further decrease in the performance loss of the HDD 212 can decrease to be below the threshold.

For example, the HDD performance management computing module 210 can perform the mitigation service at the information handling system 202 including providing a signal to the CPU 218 to maintain the throttle in the performance of the CPU 218, or further throttle the performance of the CPU 218. Specifically, when the speed of the fan 216 is further decreased for the mitigation service, as described herein, the temperature of the CPU 218 may further increase (inverse relationship). Thus, the performance of the CPU 218 may be further throttled in coordination with further reducing the speed of the fan 216 when the mitigation service is implemented.

In some examples, the HDD performance management computing module 210 can perform the mitigation service at the information handling system 202 including providing a further notification to the graphical user interface 250 of the display device 214 indicating implementation of the further mitigation service.

At any time (in parallel with determining the average performance loss and performing the mitigation service; or subsequent to performing the mitigation service), the HDD performance management computing module 210 can receive a temperature signal from the CPU 218 indicating a temperature of the CPU 218, at 426. The HDD performance management computing module 210 can compare the temperature of the CPU 218 with a threshold, at 428.

The HDD performance management computing module 210 can determine whether the temperature of the CPU 218 is greater than the threshold, at 430. In some examples, the HDD performance management computing module 210 can determine that the temperature of the CPU 218 is less than the threshold, and in response, the HDD performance management computing module 210 can determine the average performance loss of the HDD 212, at 418. In some examples, the HDD performance management computing module 210 can determine that the temperature of the CPU 218 is greater than the threshold, and in response, the HDD performance management computing module 210 can cease the mitigation service, at 424. For example, the speed of the fan 216 and/or the performance of the CPU 218 can be adjusted back to nominal operating parameters (the speed of the fan 216 and/or the performance of the CPU 218 is not mitigated).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for managing hard disk drive (HDD) performance at an information handling system, the method comprising:
   determining, for each write operation, a total number of revolutions of a disk of a hard disk drive (HDD) to complete the write operation;
   determining, for each write operation, a number of revolutions of the disk of the HDD during the write operation that a write head of the HDD is off-track;
   calculating, for each write operation, a performance loss of the HDD based on a ratio of the number of revolutions of the disk of the HDD during the write operation that the write head of the HDD is off-track to the total number of revolutions of the disk of the HDD to complete the write operation;
   determining an average performance loss of the HDD over a first time period based on the performance loss of each write operation performed for the first time period;
   comparing the average performance loss of the HDD over the first time period to a threshold; and
   determining, based on the comparing, that the average performance loss of the HDD over the first time period is greater than the threshold, and in response, performing a mitigation service at the information handling system, including providing a signal to a fan of the information handling system to decrease a speed of the fan.

2. The method of claim 1, further comprising after performing the mitigation service at the information handling system:
   determining the average performance loss of the HDD over a second time period after the first time period,
   comparing the average performance loss of the HDD over the second time period to the threshold; and
   determining, based on the comparing, that the average performance loss of the HDD over the second time period is less than the threshold, and in response, ceasing the mitigation service.

3. The method of claim 1, further comprising after performing the mitigation service at the information handling system:
   determining the average performance loss of the HDD over a second time period after the first time period,
   comparing the average performance loss of the HDD over the second time period to the threshold; and
   determining, based on the comparing, that the average performance loss of the HDD over the second time period is greater than the threshold, and in response, continuing the mitigation service.

4. The method of claim 1, wherein the mitigation service includes providing a signal to a central processing unit (CPU) of the information handling system to throttle a performance of the CPU.

5. The method of claim 1, further comprising:
   receiving a signal from a central processing unit (CPU) indicating a temperature of the CPU;
   comparing the temperature of the CPU to a threshold; and
   determining, based on the comparing, that the temperature of the CPU is above the threshold, and in response, ceasing the mitigation service.

6. The method of claim 1, further comprising:
   providing a notification to a graphical user interface (GUI) that is displayed by a display device of the information handling system indicting the mitigation service.

7. An information handling system comprising a processor having access to memory media storing instructions executable by the processor to perform operations, comprising:
   determining, for each write operation, a total number of revolutions of a disk of a hard disk drive (HDD) to complete the write operation;
   determining, for each write operation, a number of revolutions of the disk of the HDD during the write operation that a write head of the HDD is off-track;
   calculating, for each write operation, a performance loss of the HDD based on a ratio of the number of revolutions of the disk of the HDD during the write operation that the write head of the HDD is off-track to the total number of revolutions of the disk of the HDD to complete the write operation;
   determining an average performance loss of the HDD over a first time period based on the performance loss of each write operation performed for the first time period;
   comparing the average performance loss of the HDD over the first time period to a threshold; and
   determining, based on the comparing, that the average performance loss of the HDD over the first time period is greater than the threshold, and in response, performing a mitigation service at the information handling system, including providing a signal to a fan of the information handling system to decrease a speed of the fan.

8. The information handling system of claim 7, the operations further comprising after performing the mitigation service at the information handling system:
   determining the average performance loss of the HDD over a second time period after the first time period,
   comparing the average performance loss of the HDD over the second time period to the threshold; and
   determining, based on the comparing, that the average performance loss of the HDD over the second time period is less than the threshold, and in response, ceasing the mitigation service.

9. The information handling system of claim 7, the operations further comprising after performing the mitigation service at the information handling system:
   determining the average performance loss of the HDD over a second time period after the first time period,
   comparing the average performance loss of the HDD over the second time period to the threshold; and
   determining, based on the comparing, that the average performance loss of the HDD over the second time period is greater than the threshold, and in response, continuing the mitigation service.

10. The information handling system of claim 7, wherein the mitigation service includes providing a signal to a central processing unit (CPU) of the information handling system to throttle a performance of the CPU.

11. The information handling system of claim 7, the operations further comprising:

receiving a signal from a central processing unit (CPU) indicating a temperature of the CPU;

comparing the temperature of the CPU to a threshold; and determining, based on the comparing, that the temperature of the CPU is above the threshold, and in response, ceasing the mitigation service.

12. The information handling system of claim 7, the operations further comprising: providing a notification to a graphical user interface (GUI) that is displayed by a display device of the information handling system indicting the mitigation service.

13. A non-transitory computer-readable medium storing software comprising instructions executable by one or more computers which, upon such execution, cause the one or more computers to perform operations comprising:

determining, for each write operation, a total number of revolutions of a disk of a hard disk drive (HDD) to complete the write operation;

determining, for each write operation, a number of revolutions of the disk of the HDD during the write operation that a write head of the HDD is off-track;

calculating, for each write operation, a performance loss of the HDD based on a ratio of the number of revolutions of the disk of the HDD during the write operation that the write head of the HDD is off-track to the total number of revolutions of the disk of the HDD to complete the write operation;

determining an average performance loss of the HDD over a first time period based on the performance loss of each write operation performed for the first time period;

comparing the average performance loss of the HDD over the first time period to a threshold; and determining, based on the comparing, that the average performance loss of the HDD over the first time period is greater than the threshold, and in response, performing a mitigation service at an information handling system including the HDD, including providing a signal to a fan of the information handling system to decrease a speed of the fan.

14. The computer-readable medium of claim 13, the operations further comprising after performing the mitigation service at the information handling system:

determining the average performance loss of the HDD over a second time period after the first time period, comparing the average performance loss of the HDD over the second time period to the threshold; and determining, based on the comparing, that the average performance loss of the HDD over the second time period is less than the threshold, and in response, ceasing the mitigation service.

15. The computer-readable medium of claim 13, the operations further comprising after performing the mitigation service at the information handling system:

determining the average performance loss of the HDD over a second time period after the first time period, comparing the average performance loss of the HDD over the second time period to the threshold; and determining, based on the comparing, that the average performance loss of the HDD over the second time period is greater than the threshold, and in response, continuing the mitigation service.

16. The computer-readable medium of claim 13, wherein the mitigation service includes providing a signal to a central processing unit (CPU) of the information handling system to throttle a performance of the CPU.

17. The computer-readable medium of claim 13, the operations further comprising:

receiving a signal from a central processing unit (CPU) indicating a temperature of the CPU;

comparing the temperature of the CPU to a threshold; and determining, based on the comparing, that the temperature of the CPU is above the threshold, and in response, ceasing the mitigation service.

* * * * *